United States Patent
Breyta et al.

(10) Patent No.: US 11,807,725 B2
(45) Date of Patent: Nov. 7, 2023

(54) FEEDSTOCK ENGINEERING OF POLYESTER WASTE FOR RECYCLING PROCESSES

(71) Applicant: International Business Machines Corporation, Armonk, NY (US)

(72) Inventors: Gregory Breyta, San Jose, CA (US); Robert David Allen, Golden, CO (US); Nitin Shashikant Parekh, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 17/540,184

(22) Filed: Dec. 1, 2021

(65) Prior Publication Data
US 2022/0169823 A1     Jun. 2, 2022

Related U.S. Application Data

(60) Provisional application No. 63/120,364, filed on Dec. 2, 2020.

(51) Int. Cl.
    *C08J 11/20*     (2006.01)

(52) U.S. Cl.
    CPC ............ *C08J 11/20* (2013.01); *C08J 2367/02* (2013.01)

(58) Field of Classification Search
    USPC ........................................................ 528/48.5
    See application file for complete search history.

(56) References Cited

U.S. PATENT DOCUMENTS

| | | | |
|---|---|---|---|
| 3,284,348 A | 11/1966 | Hutton | |
| 3,666,791 A | 5/1972 | Chikawa et al. | |
| 3,668,235 A | 6/1972 | Ichikawa et al. | |
| 3,691,092 A | 9/1972 | Floria | |
| 4,003,880 A | 1/1977 | Sidebotham et al. | |
| 4,003,881 A | 1/1977 | Sidebotham et al. | |
| 4,064,079 A | 12/1977 | Sidebotham et al. | |
| 4,118,187 A | 10/1978 | Sidebotham et al. | |
| 4,137,393 A | 1/1979 | Sidebotham et al. | |
| 5,342,854 A | 8/1994 | Serad | |
| 7,030,264 B1 | 4/2006 | Inada et al. | |
| 7,211,193 B2 | 5/2007 | Inada et a | |
| 9,255,194 B2 | 2/2016 | Allen et al. | |
| 9,914,816 B2 | 3/2018 | Allen et al. | |
| 2004/0182782 A1 | 9/2004 | Inada et al. | |
| 2007/0265361 A1 | 11/2007 | Maurer et al. | |
| 2015/0232632 A1 | 8/2015 | Walker | |
| 2017/0218162 A1 | 8/2017 | Walker | |
| 2019/0345306 A1 | 11/2019 | Walker | |

FOREIGN PATENT DOCUMENTS

| | | | |
|---|---|---|---|
| CN | 102061005 A | | 11/2011 |
| CN | 103304839 A | | 9/2013 |
| EP | 11533966 A1 | * | 11/2001 |
| JP | H1160795 A | | 3/1999 |
| WO | 2021032826 A1 | | 2/2021 |

OTHER PUBLICATIONS

International Search Report and Written Opinion for the counterpart PCT Application No. PCT/IB2021/061240 dated Mar. 2, 2022 (10 pages).

* cited by examiner

*Primary Examiner* — Terressa Boykin
(74) *Attorney, Agent, or Firm* — Karen Canaan; CanaanLaw, P.C.

(57) ABSTRACT

A waste polyester material is prepared for recycling by dissolving the material in a solution comprising hexafluoroisopropyl (HFIPA) and a chlorinated hydrocarbon, such as dichloromethane (DCM) and/or an aromatic hydrocarbon, such as toluene or xylene, to form a dissolved polyester sample. The dissolved polyester may be prepared for recycling by evaporation, spray drying, and/or precipitation, which produces a purified solid polyester product. The dissolution solution, which is separated from the purified solid polyester product, is also recycled through distillation with purification.

26 Claims, 14 Drawing Sheets
(13 of 14 Drawing Sheet(s) Filed in Color)

Time Sequence Extraction of PET Color Flake and Dirty Mixed Curbside PET Flake

Dirty Mix Curbside Flake Extracts
@ 1, 2, 3 hrs

Color Flake DCM Extracts
@ 1, 2, 3, 4, 5, 6, 72 hrs

DCM Pre-Treatment of Black PET Fabric

Black PET Fabric (as received) — Decolorization with DCM Pre-Treatment — Decolorized Black PET Fabric — Recovered Dyes CC and PCC PET Flake Decolored Films Filtered Solution L*=64.75 a*=-1.29 b*=1.89

CC PET Flake

5% AC

L*=51.48 a*=-0.70 b*=-0.11

L*=81.37 a*=-0.54 b*=-0.30

L*=80.36 a*=-0.63 b*=0.21

PCC PET Flake

FEEDSTOCK ENGINEERING OF POLYESTER WASTE FOR RECYCLING PROCESSES

TECHNICAL FIELD

The present invention relates generally to recycling processes and more specifically to a method of purifying waste polyester feedstock with a combination of dichloromethane (DCM) and hexafluoroisopropyl alcohol (HFIPA).

BACKGROUND OF THE INVENTION

The presence of impurities in low quality plastic waste causes problems in the efficiency and effectiveness of chemical and mechanical recycling of plastic waste. For example, small amounts of impurities (such as dyes, pigments, dirt, and foreign or dissimilar polymers) in monomer or polymer feed streams can be highly detrimental to the quality of the incoming feedstock and result in severe degradation of the mechanical, optical, and/or barrier properties of the reformed polymer.

Chemical recycling uses waste plastic or waste textiles as a feedstock. The recycling process dissolves polymers and/or produces monomers to prepare a new plastic material. Very high purity (>99%) is required for the monomers to make new high molecular weight polyester via step-growth/condensation polymerization. An on-going challenge in chemical recycling is how to take a low quality, compositionally fluctuating feedstock and process it through depolymerization and monomer purification to create an end product (a monomer) that is of the quality required for condensation (or step-growth) polymerization. Currently, post-reaction purification is carried out by decolorization and deionization through treatment with activated carbon and ion exchange resins. While these techniques, along with pre-reaction distillation, are largely successful in removing impurities, including color, the dirtier and more colored the input, the more frequent the regeneration of purification media must occur. The process to reactivate spent or contaminated activated carbon is typically pyrolytic (at temperatures ranging from 600-900° C.), which incurs a large energy cost. Further, ion exchange bed regeneration, which involves backflow washing with dilute acid or base, incurs environmental waste and/or the need for additional processing.

Mechanical recycling can only use colorless inputs that have been stringently cleaned. Because mechanical recycling has zero tolerance toward foreign matter, a great deal of plastic is rejected in the sorting process. Within the context of polyethylene terephthalate (PET) bottles, a batch of PET bottles with just 1% of polyolefins (e.g., bottle caps, rings, labels, etc.) will not qualify for mechanical recycling and will be rejected. Due to these limitations, mechanical recycling is a low recovery recycling process (<57%).

SUMMARY OF THE INVENTION

In one aspect, the present invention relates to a method comprising: treating a waste material comprising a polyester with a dissolution solution comprising hexafluoroisopropyl alcohol and a chlorinated hydrocarbon and/or an aromatic hydrocarbon to form dissolved polyester; purifying the dissolved polyester; and treating the dissolved polyester with a technique to produce solid polyester, wherein the dissolution solution is separated from the solid polyester.

In another aspect, the present invention relates to a method comprising: treating a waste material comprising polyethylene terephthalate (PET) with a dissolution solution comprising 30% hexafluoroisopropyl alcohol and 70% dichloromethane to form dissolved PET; purifying the dissolved PET; and treating the dissolved PET with a technique to produce solid PET for reuse, wherein the dissolution solution is separated from the solid PET.

Additional aspects and/or embodiments of the invention will be provided, without limitation, in the detailed description of the invention that is set forth below.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 8A shows the CC PET flake with DCM pre-treatment (vials three and four) and without DCM pre-treatment (vials one and two). FIG. 8B shows the vials 15 minutes after the start of dissolution with DCM/HFIPA 70/30 (vials one and three) and neat HFIPA (vials two and four) and FIG. 8C shows the same vials 30 minutes later (45 minutes after dissolution).

FIG. 9A is a photograph showing solutions of dirty mixed (DM) PET flake without DCM pre-treatment (left), clean-color (CC) PET flake without DCM pre-treatment (middle) and CC PET flake with DCM pre-treatment (right). FIG. 9B is a photograph of the solutions of the DM and CC PET flake samples after treatment and purification.

DETAILED DESCRIPTION OF THE INVENTION

Figure 1:
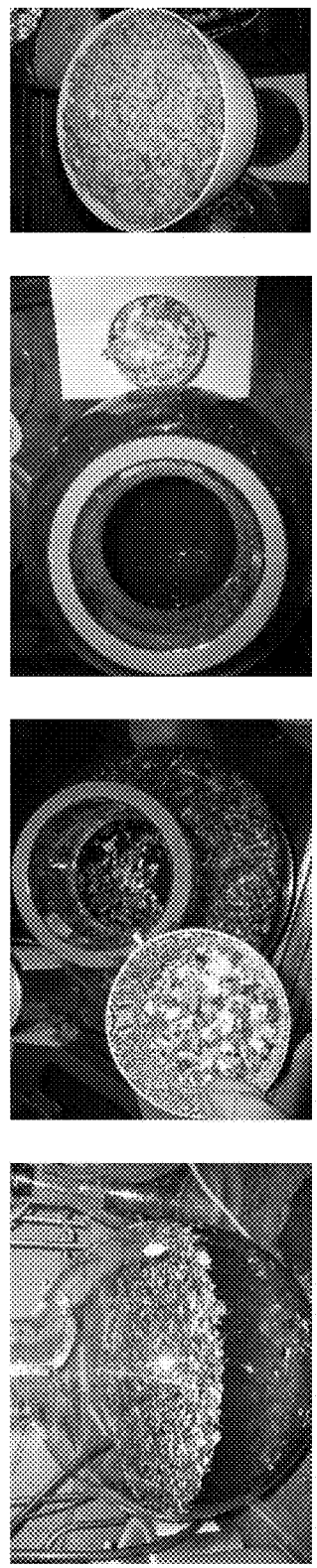
FIG. 1 are photographs showing the separation products resulting from the pre-treatment of dirty mixed (DM) PET flake with dichloromethane (DCM) (Example 1).

The descriptions of the various aspects and/or embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the aspects and/or embodiments, the practical application or technical improvement over technologies found in the marketplace, or to enable others of ordinary skill in the art to understand the aspects and/or embodiments disclosed herein.

As used herein, the term "mechanical recycling" refers to a recycling process that maintains the molecular structure of a waste polyester product by chipping the polyester waste and remelting and extruding to make recycled pellets that are ready for remolding applications or directly formed into new commodities. Mechanical recycling requires uncontaminated, color free waste streams, which requires thorough sorting and cleaning such that only similar materials are recycled together and have no or little color content.

As used herein, the term "chemical recycling" refers to a process by which a plastic polymer is chemically reduced to its original monomer so that it can be repolymerized and remade into a new plastic material. With chemical recycling, plastic waste streams can be converted back into feedstock for further recycling. Unlike mechanical recycling, which requires sorted single-stream plastic waste, chemical recycling can be used for mixed post-consumer plastic waste streams, which consist of polyethylene (PE), polypropylene (PP), and polystyrene (PS). Chemical recycling is also more tolerant of colorant and dirt content than mechanical recycling. Chemical recycling processes include, without limitation, solvent dissolution and depolymerization processes. Examples of depolymerization recycling reactions include, without limitation, alcoholysis (e.g., glycolysis and methanolysis), solvolysis, hydrolysis, acidolysis, phosphorolysis, aminolysis, ammonolysis, enzymolysis, and other interchange reactions that produce oligomers or monomers. By way of clarification, within the context of the depolymerization of polyesters, with alcoholysis, a transesterification reaction occurs where the alcohol group cleaves the ester bonds of the polymer.

As used herein, the term "glycolysis depolymerization" refers to a depolymerization recycling process where a glycol is inserted into the polymeric chains breaking the ester linkages and replacing them with hydroxylalkyl terminals. Examples of glycols used in glycolysis depolymerization include, without limitation, ethylene glycol, diethylene glycol, propylene glycol, 1,3-propanediol, 1,4-butanediol, cyclohexanedimethanol, and dipropylene glycol.

As used herein, the term "solvent dissolution" refers to a chemical recycling process where a solvent is used to dissolve polymers and separate them from other materials.

Described herein is a solvent-based feedstock engineering process that prepares polyester samples (e.g., PET bottles) or textile material (e.g., polyester fabrics and/or fibers) for chemical or mechanical recycling through homogenization of differing polyester grades, copolymers, and colors in the feed. When feedstock input is treated with the solvent described herein, and treated with further purification processes, the recycled output is a high-quality product with low color and intact mechanical properties, such as intrinsic viscosity. The solvent used in the feedstock engineering process is capable of dissolving polyester (e.g., PET in flake, fabric, or fiber form) selectively and rapidly, solvates all molecular weights of polyesters, is high yield, and is easily recovered for reuse.

With polyester recycling, colored, dirty, and/or mixed polymer input generally require pre-treatment to remove color and impurities prior to dissolution, the latter of which is a preliminary step in polyester recycling. Polyester samples may be decolored and/or purified prior to the initiation of the recycling process by treatment with dichloromethane (DCM). Examples of impurities that are present in polyester feedstock samples that can cause problems with downstream recycling include, without limitation, non-ester polymers, physical dirt and/or grime, colorants, organic impurities, metallic and ionic impurities, and combinations thereof. One non-limiting example of an organic impurity is acetaldehyde or its acetal. Examples of metallic and ionic impurities include, without limitation, aluminum or aluminum-containing films, iron and copper as wire or powder. Examples of non-ester polymers that are present in polyester feedstock include polymers such as, for example, polyolefins (which are found in bottle caps), polyamides (e.g., nylon), polyimides, polyurethanes, and polyvinylchloride.

Within the context of textile recycling, dissolution recycling processes used in the art affect the quality of the recovered polyester (including PET) due to fractional removal (solvation) of the lower molecular weight portion of the polyester and a decrease in the intrinsic viscosity of the polyester polymer (i.e., the measure of the polymers molecular weight, melting point, crystallinity, and tensile strength). In a polyester/cotton mixed-fiber application, the solvation and decrease in intrinsic viscosity of the polyester polymer results in a residue of high molecular weight polyester (typically PET) on the cotton, which imparts undesirable characteristics to the recycled cotton fiber.

Figure 6:
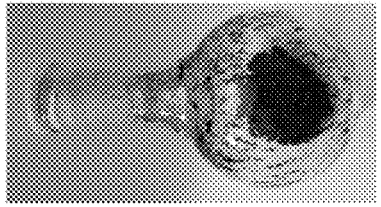
FIG. 6 are photographs showing the decolorization of black polyester fabric with DCM pre-treatment (Example 3).
Figure 6:
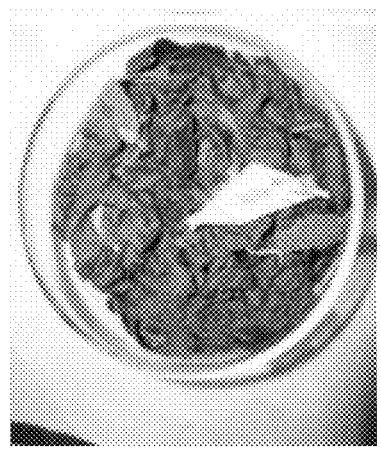
Figure 6:
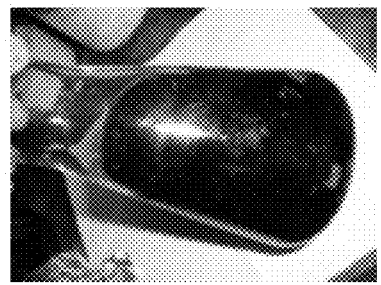
Figure 6:
Figure 7:
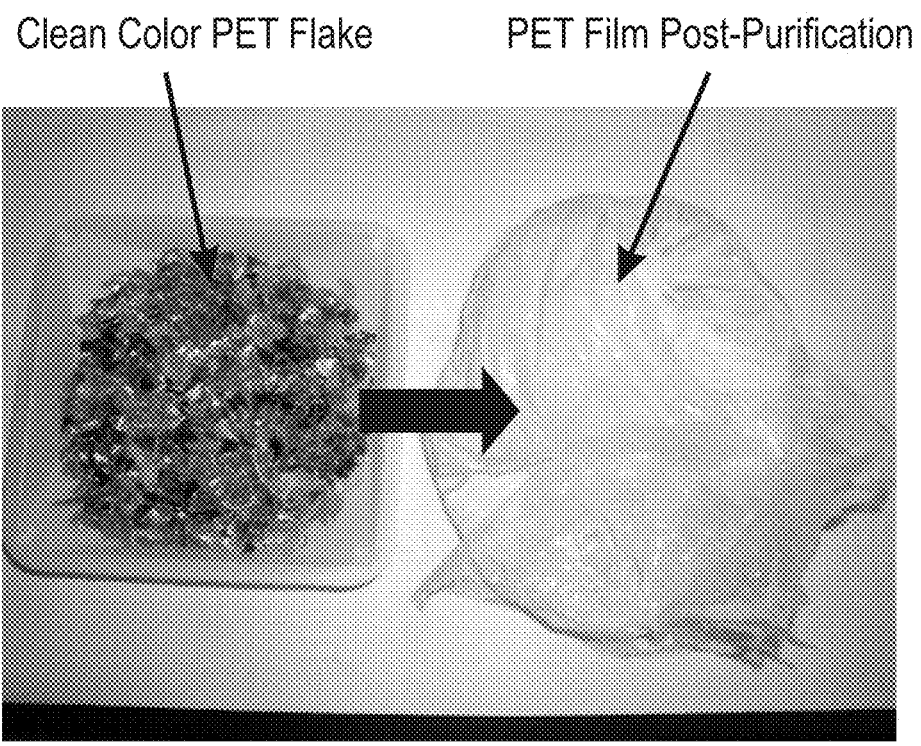
FIG. 7 are photographs showing the decolorization of CC PET flake after HFIPA (hexafluoroisopropyl alcohol) treatment (Example 4).

While DCM (bp 39.6° C.) is effective for removing color and purifying polyesters, including PET (Examples 1-3; FIGS. 1-6), it is a known non-solvent for polyesters, including PET. Because many non-ester polymers have densities that are lower than the density of PET and DCM, when a PET sample is treated with DCM, the non-ester polymers present in the PET sample float to the surface of the DCM liquid where they can be filtered (e.g., through skimming) off of the surface of the liquid. By contrast, hexafluoroisopropyl alcohol (HFIPA, pb 58.2° C.) is a known solvent for polyesters, including PET (Example 4; FIG. 7). Surprisingly and unexpectedly, it has been found that the addition of a polyester non-solvent, such as DCM, in combination with the polyester solvent HFIPA produces a better solvent for polyesters than HFIPA alone.

Examples of polyester non-solvents that may be used in combination with HFIPA for polyester dissolution includes, without limitation, chlorinated hydrocarbons, such as DCM, and aromatic hydrocarbons, such as toluene and p-xylene. The chlorinated and aromatic hydrocarbons may be used individually or in combination with the HFIPA to dissolve the polyester in preparation for recycling. In one embodiment, the percentage of polyester non-solvent in the HFIPA mixed-solvent solution is the residual DCM that is used for the pre-treatment of the waste polyester. In another embodiment, the polyester non-solvent has a concentration of 1-85% of the total solution. In a further embodiment, the polyester non-solvent has a concentration of 10-80% of the total solution. In another embodiment, the polyester non-solvent has a concentration of 20-80% of the total solution. In a further embodiment, the polyester non-solvent has a concentration of 20-70% of the total solution. In another embodiment, the polyester non-solvent has a concentration of 30-70% of the total solution. In a further embodiment, HFIPA/polyester non-solvent (also referred to herein as the "HFIPA mixed-solvent") has a concentration of 70% polyester non-solvent and 30% HFIPA. In another embodiment, the HFIPA mixed-solvent is 70% DCM and 30% HFIPA. It is to be understood that the percentage of polyester non-solvent in the HFIPA mixed-solvent may include residual polyester non-solvent from the polyester pre-treatment described herein.

The HFIPA mixed-solvent may be used with any recycling process to increase product purity and reduce processing costs, time, and complexity. The discussion that follows will reference the DCM/HFIPA 70/30 formulation as an exemplary HFIPA mixed-solvent formulation and PET as an exemplary polyester; however, it is to be understood that the other polyester non-solvents referenced herein may be used instead of DCM in the polyester dissolution formulation and that any polyesters may be used instead of PET.

Figure 8A:
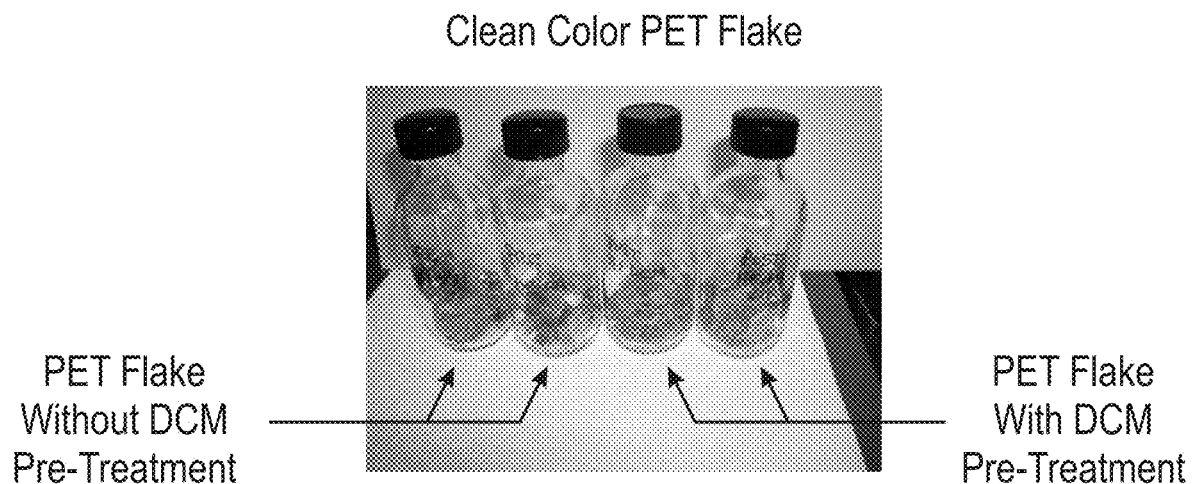
FIGS. 8A-8C are photographs of four vials containing CC PET flake (Example 5).
Figure 8B:
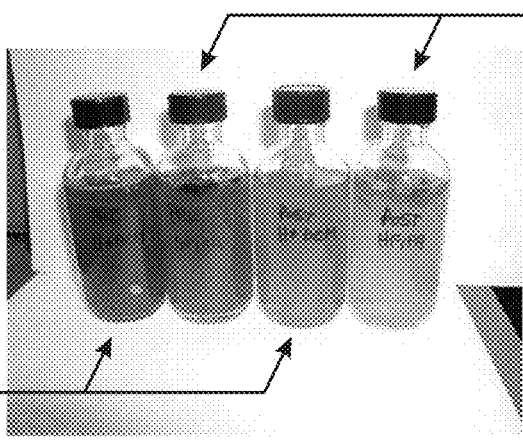
Figure 8C:
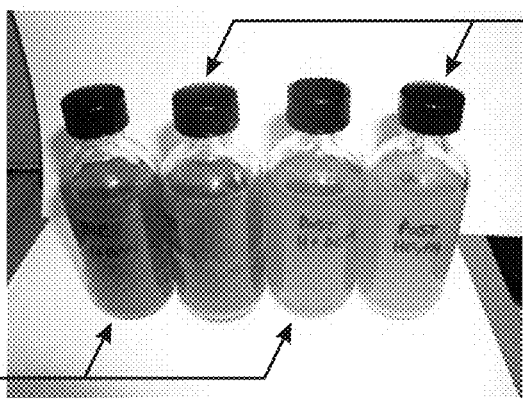
Figures 9A, 9B:
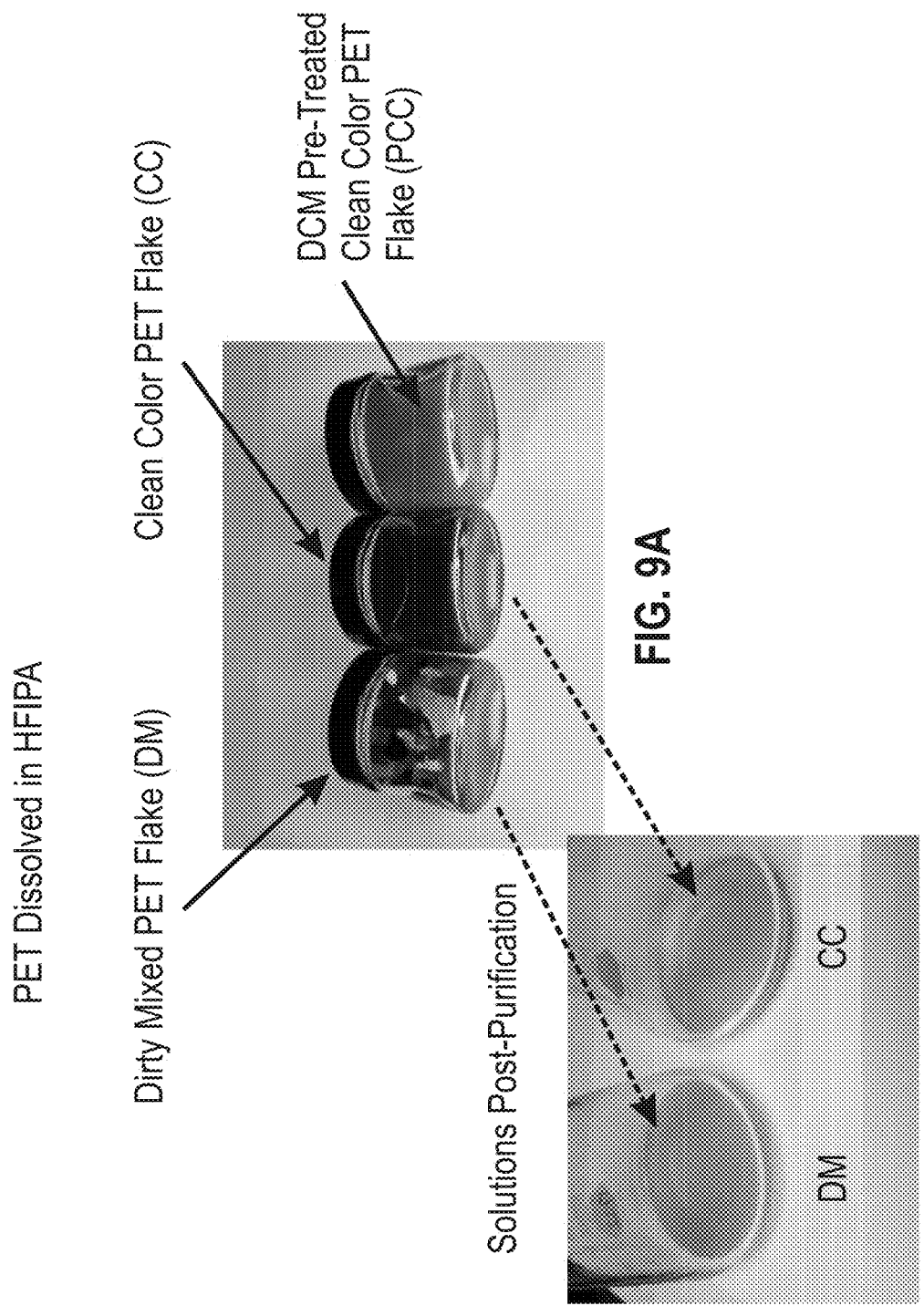
FIG. 9A-9B are photograph showing PET pre and post HFIPA treatment with and without DCM pre-treatment (Example 6).

With reference to FIGS. 8A-8C (Example 5) these figures show the improvement in dissolution of PET flake using the DCM/HFIPA 70/30 formulation (over HFIPA alone) and further dissolution enhancement with the DCM pre-treated PET. FIG. 8A shows the PET flake prior to dissolution. As shown therein, vials three and four, which were subject to DCM pre-treatment have much of the original PET color removed when compared to vials one and two, which were not subject to DCM pre-treatment. FIG. 8B shows the same vials 15 minutes after dissolution with DCM/HFIPA 70/30 (vials one and three) and HFIPA alone (vials two and four). As shown therein, vials two and four, which were dissolved with HFIPA alone, had undissolved PET flake floating on the top of the liquid after 15 minutes (FIG. 8B) and both vials still showed undissolved PET flake 30 minutes later (FIG. 8C). By contrast, vial three, which was subject to both DCM pre-treatment and dissolution with DCM/HFIPA 70/30, produced a solution with the PET fully dissolved after only 15 minutes. Vial one, which was subject to DCM/HFIPA 70/30 as the solvent but without DCM pre-treatment, produced a solution with only a small amount of undissolved PET after 15 minutes, but was fully dissolved after an additional 30 minutes. The solutions in FIGS. 8B and 8C show effective dissolution of PET with the DCM/HFIPA 70/30 formulation and an additive effect on PET dissolution when the PET is pretreated with DCM. With reference to the DCM pre-treatment, the color of the solutions in the third and fourth vials of FIGS. 8B and 8C are much lighter than the solutions in the first and second vials of those figures. FIGS. 9A and 9B (Example 6). shows a similar result that clean-color (CC) PET flake treated with neat HFIPA produces a lighter solution after pre-treatment with DCM than without the pre-treatment. Most of the color remaining in the DCM pre-treated samples in all of these cases is due to the presence of insoluble blue pigment, which is easily removed by filtration.

Figure 10:
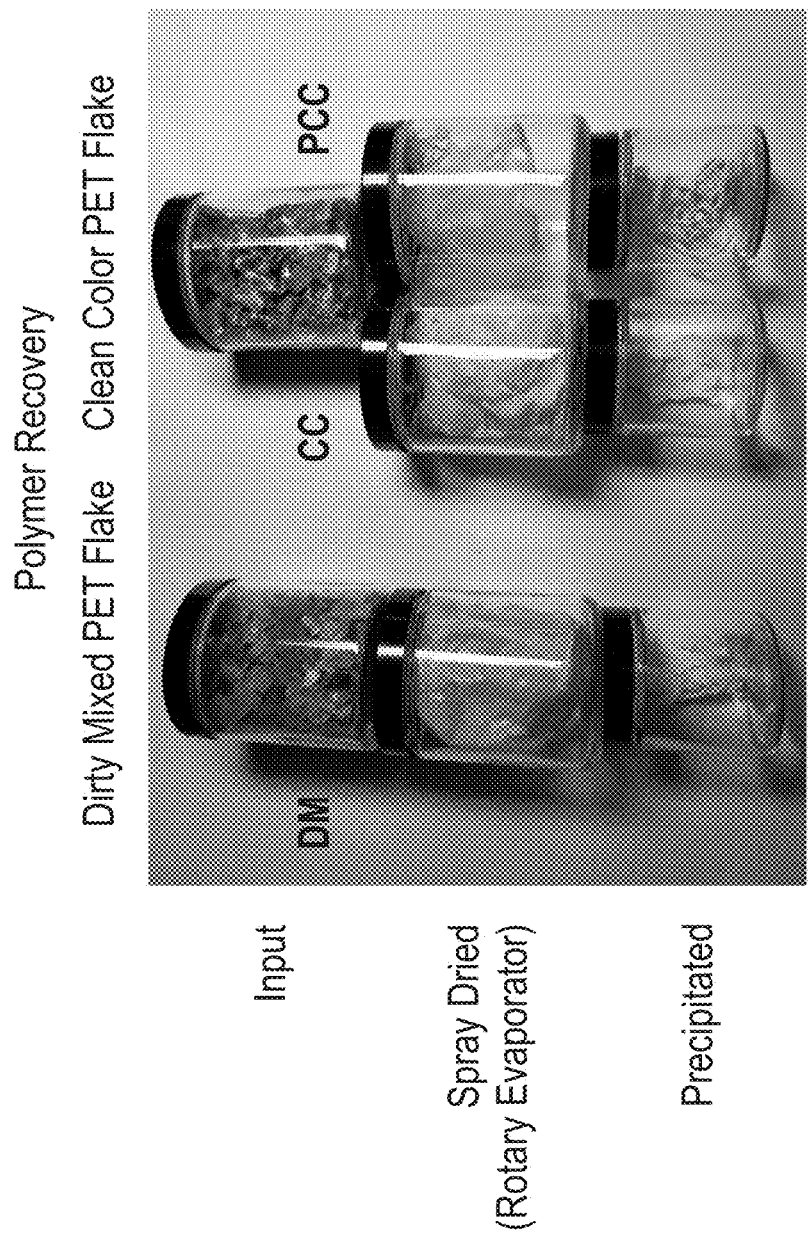
FIG. 10 is a photograph showing PET films obtained from DM, CC, and DCM-pre-treated CC (PCC) PET flake after treatment with DCM/HFIPA 70/30 and purification (Example 7).
Figure 11:
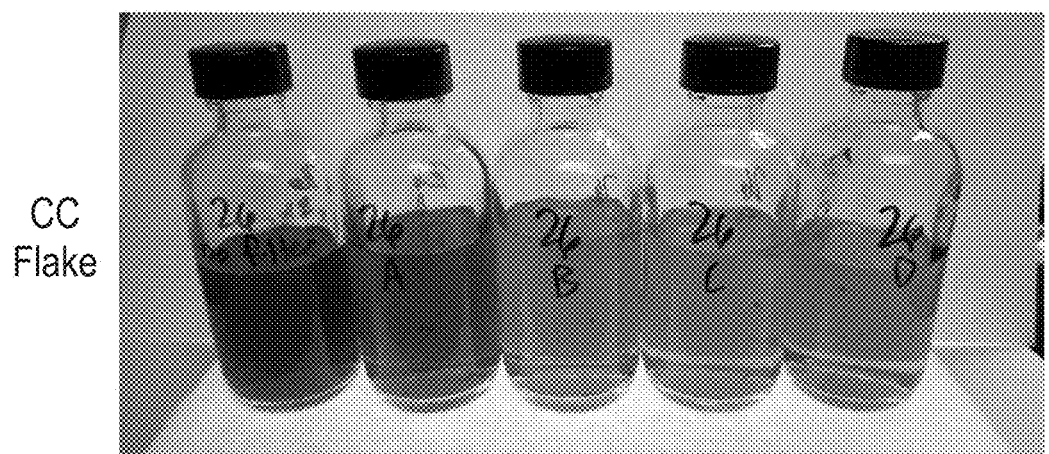
FIG. 11 are photographs showing solutions of CC and PCC PET flake before and after treatment with DCM/HFIPA 70/30 and activated carbon purification and filtration (Example 8).
Figure 11:
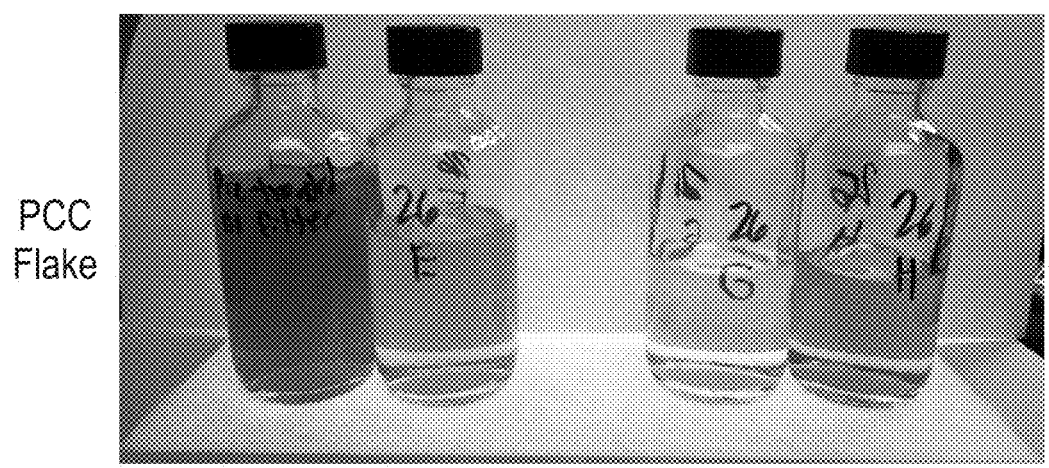
Figure 12:
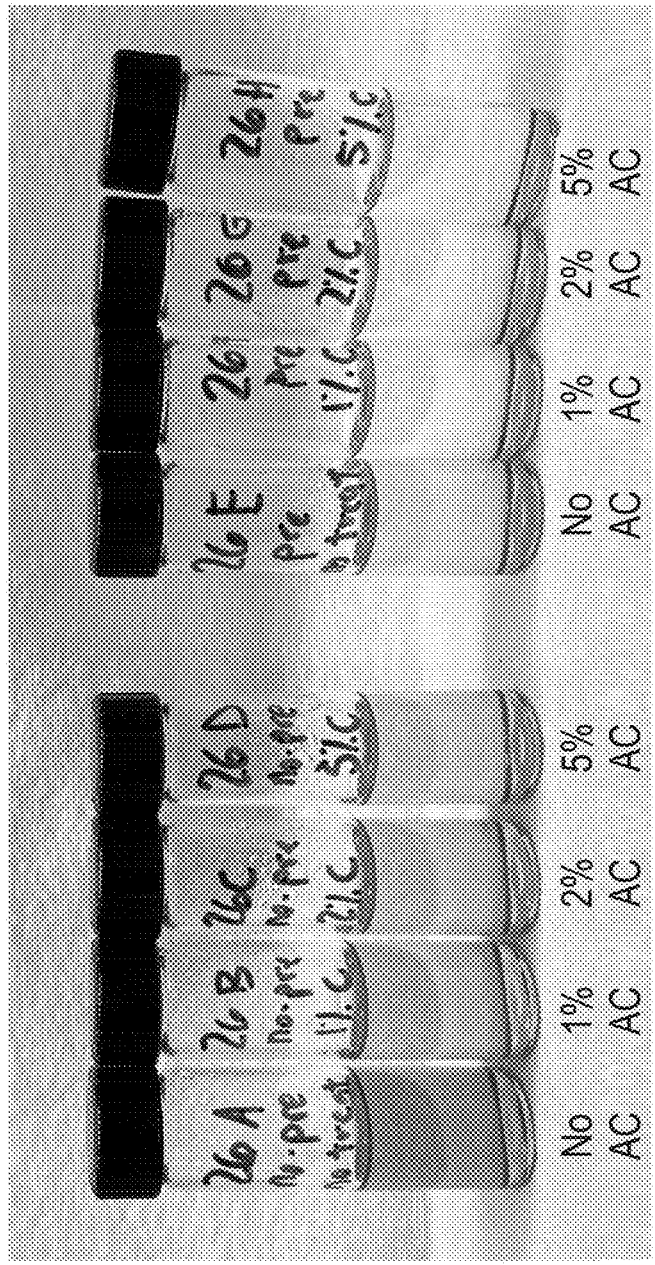
FIG. 12 is a photograph showing solutions of CC and PCC PET flake before and after treatment with DCM/HFIPA 70/30, activated carbon purification, and filtration through a 1.0 um filter membrane (Example 8).
Figure 13:
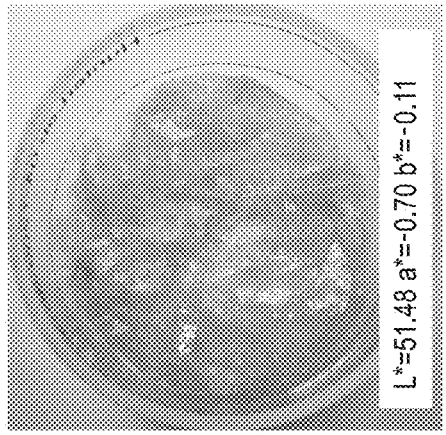
FIG. 13 is a photograph of the PET films recovered from CC and PCC PET flake treated DCM/HFIPA 70/30 with and without decolorization (Example 9).
Figure 13:
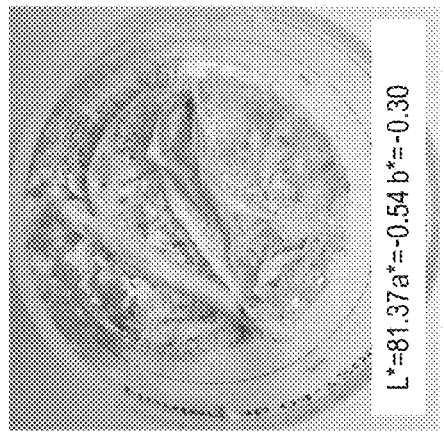
Figure 13:
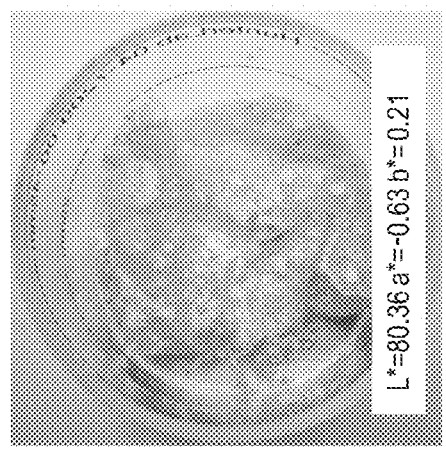

After treatment with the HFIPA mixed-solvent (and with optional purification by, for example, decolorization, deionization and/or filtration), the polyester can be recovered by evaporation, spray drying, and/or precipitation (Examples 7 and 9; FIGS. 10, 13). The dried polyester can then be subjected to either further chemical or mechanical recycling. Where necessary, following the HFIPA mixed-solvent treatment, but prior to the initiation of the recycling process, the dried polyester may be further decolorized and/or deionized via activated carbon treatment (Example 8; FIGS. 11, 12) and/or ion exchange.

With reference to the DCM/HFIPA 70/30 described herein, this formulation conveniently produces a low boiling azeotrope (bp 36° C.) that rapidly dissolves polyesters at a low temperature. The DCM/HFIPA azeotrope solvent, along with any HFIPA and DCM, may be recycled for reuse following low temperature distillation or direct condensation from the polyester recovery process. The DCM and HFIPA, both as the azeotropic mixture or individually, are conveniently purified and recovered from dissolved impurities such as colorants, dyes and other organic materials by low temperature distillation between 36 to 58° C. Once purified, the recovered azeotrope, DCM, and HFIPA may be used anew facilitating a closed loop recycling process.

It is to be understood that not all polyester samples may require pre- or post-treatment for decolorization/deionization. The utility of the pre- and post-purification treatments will depend on how clean the polyester samples are prior to recycling. For recycled PET that will be used in food grade products, the pre- and post-treatment steps may be necessary to produce a suitable recycled product. By contrast, recycled PET that will be used for industrial purposes, such as carpets or piping, will not necessarily require the extra treatments.

In one embodiment, the product obtained from the HFIPA mixed-solvent purification process provides input into an alcoholysis depolymerization recycling process. One non-limiting alcoholysis depolymerization recycling process is the volatile catalyst (VolCat) chemical recycling process. The VolCat chemical recycling process is described in U.S. Pat. No. 9,255,194 B2 to Allen et al. and U.S. Pat. No. 9,914,816 B2 to Allen et al. In one embodiment, the VolCat process depolymerizes polyester with an alcohol solvent and an organocatalyst in a reactor at a temperature at or higher than the boiling point of the alcohol. In another embodiment, the organocatalyst has a boiling point at least 50° C. lower than the boiling point of the alcohol solvent and the depolymerization is run at a temperature higher than the boiling point of the alcohol solvent. In a further embodiment, the organocatalyst has a boiling point at least 50° C. lower than the boiling point of the alcohol solvent and the depolymerization is run at a temperature higher than the boiling point of the organocatalyst. In another embodiment, the polyester input and the alcohol solvent are heated to a reaction temperature of about 200-250° C. prior to the introduction of the organocatalyst. Reaction products from the VolCat depolymerization are monomeric and/or oligomeric diesters from the polyester as well as recovered organocatalyst and excess alcohol solvent, the former of which is intended for reuse into recycled polyester products and the latter of which may also be reused in subsequent depolymerization reactions.

In another embodiment, the VolCat reaction is carried out in a chemical reactor, which may be a pressure reactor, such as an autoclave or extrusion reactor, or a non-pressurized reactor, such as a round bottom flask. In a further embodiment, the depolymerization reaction, which may be pressurized or non-pressurized, as well as one or more optional purification steps for the monomer product are carried out in batches and/or in a continuous flow process. In another embodiment, a solvent in which the monomer product has limited solubility may be used to purify the depolymerized polyester monomer product, whether obtained in a batch process or though continuous flow. Alcohol and/or water are non-limiting examples of such purification solvents. Where an alcohol is used for the purification, the alcohol may be the unreacted alcohol from the depolymerization reaction or a newly introduced clean alcohol. In a further embodiment, the recovered monomer product obtained from the VolCat reaction may be used to produce a new polymer material.

In another embodiment, the polyester is selected from the group consisting of polyethylene terephthalate (PET), polyethylene naphthalate (PEN), polybutylene terephthalate (PBT), polytrimethylene terephthalate (PTT), polyethylene furanoate (PEF), polyethylene terephthalate glycol-modified (PETG), poly(lactic acid) (PLA), and combinations thereof. In a further embodiment, the alcohol solvent is a glycol and/or diol solvent. In another embodiment, the alcohol solvent is selected from the group consisting of 1,2-ethanediol (ethylene glycol, EG), 1,3-propanediol (trimethylene glycol), 1,4-butanediol (tetramethylene glycol), 1,5-pentanediol (pentylene glycol), and combinations thereof. In a further embodiment, the organocatalyst is an amine organocatalyst and/or carboxylic salt of same. In another embodiment, the amine of the amine organocatalyst and/or carboxylic acid salt of same is a tertiary amine. In a further embodiment, the amine organocatalyst and/or carboxylic acid salt of same is selected from the group consisting of triethylamine (TEA), tetramethylethylenediamine (TMEDA), pentamethyldiethylenetriamine (PMDETA), trimethyl triaza cyclononane (TACN), 4-(N,N-dimethylamino)pyridine (DHAP), 1,4-diazabicyclo [2.2.2]octane (DABCO), N-methyl imidazole (NMI), and combinations thereof. In another embodiment, the amine organocatalyst and/or carboxylic acid salt of same is TEA and/or a carboxylic acid salt of same. In a further embodiment, the polyester input comprises a terephthalate and the recovered depolymerized reaction product comprises a terephthalate ester monomer. In another embodiment, the polyester input comprises PET and the recovered polyester monomer product is bis(2-hydroxyethyl)terephthalate (BHET). In a further embodiment, the polyester input comprises PET, the alcohol is EG, the amine organocatalyst is TEA and/or a carboxylic salt of same, and the recovered reaction products comprise unreacted EG, the TEA, and BHET.

In another embodiment, the recovered product of the HFIPA mixed-solvent purification process provides input into a mechanical recycling process. In this type of process, the purified output can be remelted directly into recycled PET pellets, filaments, and/or fibers.

The descriptions of the various aspects and/or embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the aspects and/or embodiments, the practical application or technical improvement over technologies found in the marketplace, or to enable others of ordinary skill in the art to understand the aspects and/or embodiments disclosed herein.

EXPERIMENTAL

The following examples are set forth to provide those of ordinary skill in the art with a complete disclosure of how to make and use the aspects and embodiments of the invention as set forth herein. While efforts have been made to ensure accuracy with respect to variables such as amounts, temperature, etc., experimental error and deviations should be taken into account. Unless indicated otherwise, parts are parts by weight, temperature is degrees centigrade, and pressure is at or near atmospheric. All components were obtained commercially unless otherwise indicated.

Example 1

Figure 2:
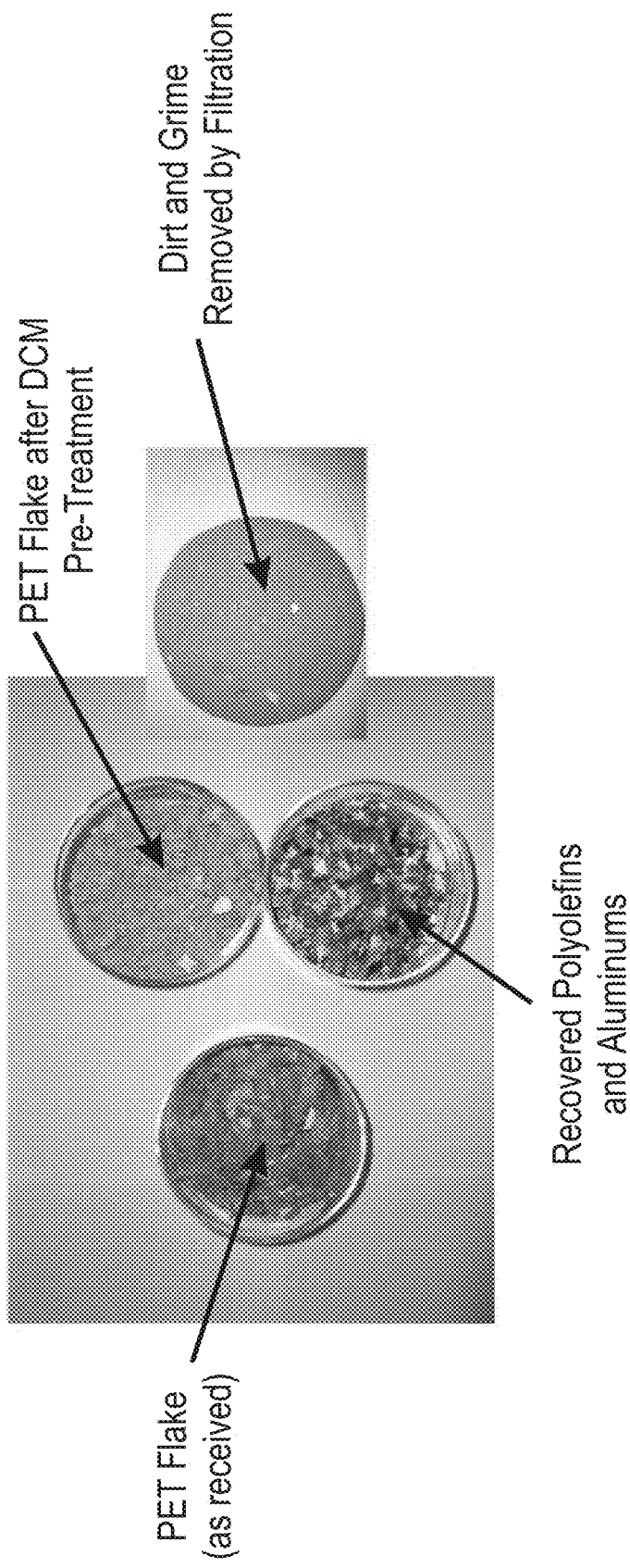
FIG. 2 are photographs showing a comparison of incoming DM PET flake and the recovered PET product after pre-treatment with DCM (Example 2)
Figure 4:
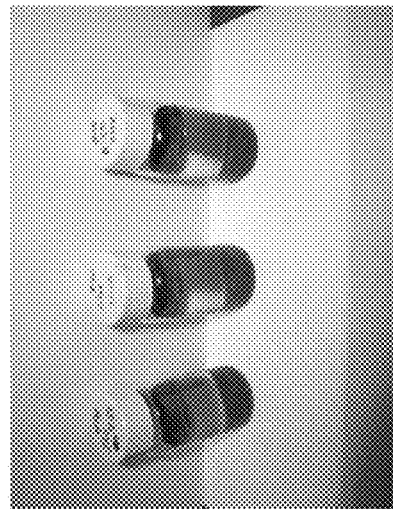
FIG. 4 are photographs showing time sequence DCM extracts obtained from DCM-treated CC and DM PET flake (Examples 1 and 2).
Figure 4:
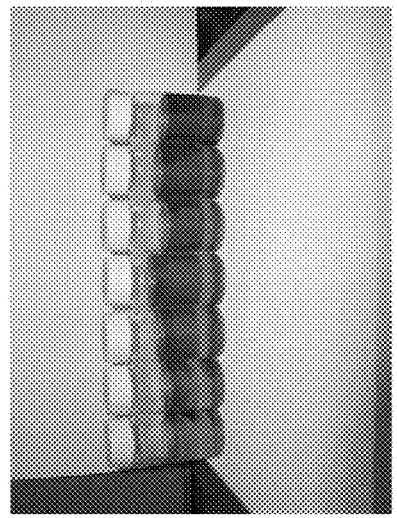

DCM Purification of Dirty Mixed Pet Flake 2.5 kg of curbside mixed PET flake was added to a 22 L glass reactor along with 12 L DCM and stirred gently at room temperature. The DCM immediately took up a surprising amount of color even before stirring. Samples of DCM were taken at 1, 2, and 3 hours followed by the skimming of less dense material from the surface of the liquid, which was found to be PE, PP, and an aluminum-containing film. Much of the dirt and grime that was originally on or in the dirty PET was released into the DCM liquid and was easily filtered from the liquid leaving cleaned PET flakes, which were easily recovered by a subsequent filtration. There was very little colored material in the resultant product either as polyolefin or color remaining in the PET. FIG. 1, panel 1 shows PET submerged in DCM (which has taken up color) with polyolefins and aluminum foil afloat. FIG. 1, panel 2, shows the removal of floating material from the surface of the DCM liquid and dirt/grime with a wire mesh screen and FIG. 1, panel 3, shows dirt/grim suspended in the remaining DCM liquid. FIG. 1, panel 4 shows the recovered purified PET flake. FIG. 2 shows the input curbside dirty mixed PET flake (left panel), the purified PET (top center), the recovered polyolefins and aluminum (bottom center), and the filtered dirt and grime removed during filtration (right panel). FIG. 4 (right) shows the three DCM solution time-sequence samples.

Example 2

Figure 3A:
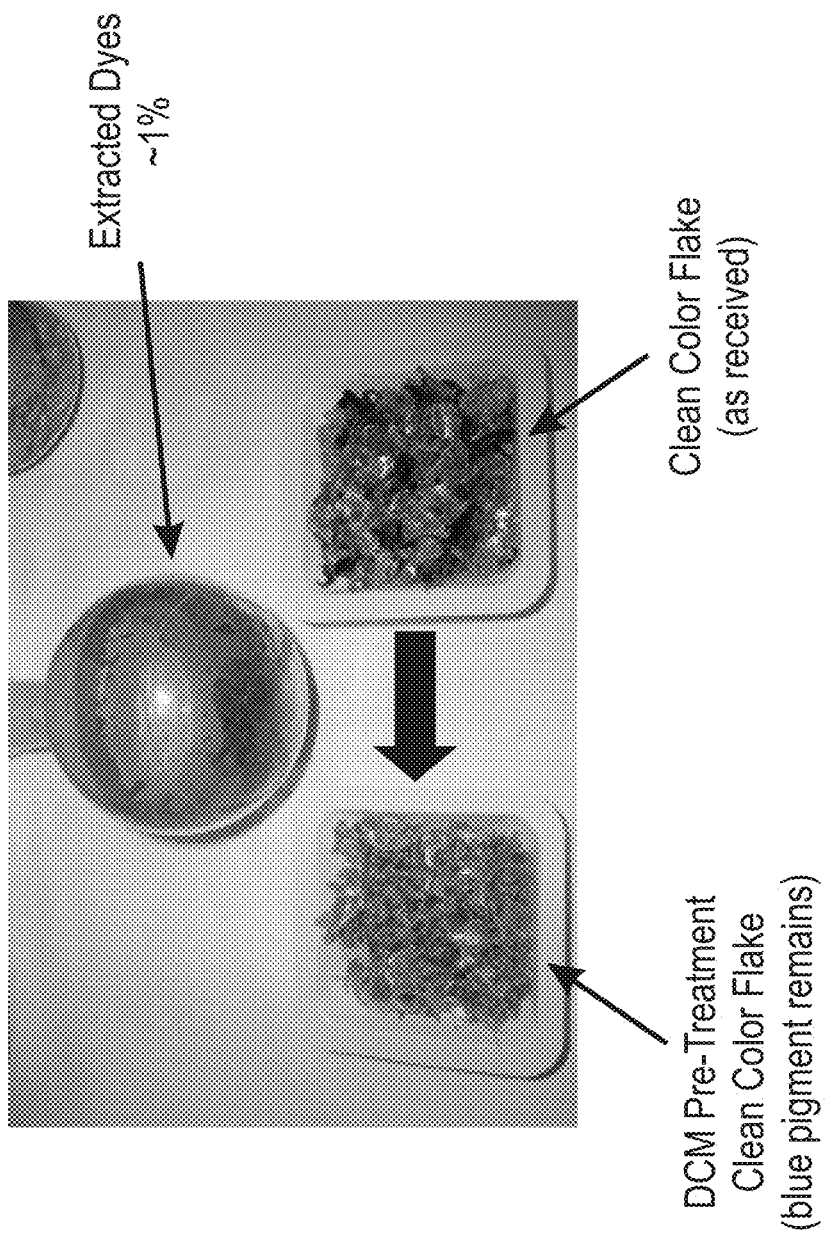
FIGS. 3A and 3B are photographs showing products resulting from pre-treatment of PET clean-color (CC) flake with DCM (Example 2).
Figure 3B:

DCM Purification of Clean-Color Pet Flake 2.5 kg of clean-color PET flake was added to a 22 L glass reactor along with 12 L DCM and stirred gently at room temperature. The DCM immediately became a dark color even before stirring. Samples of DCM were taken at 1, 2, 3, 4, 5, 6, and 24 hours followed by recovery of the PET flakes by filtration. FIG. 3A shows a portion of the clean-color PET flake before (right) and after (left) DCM treatment along with a portion of the extracted dyes and other material after evaporation of the DCM (top, in flask). FIG. 3B shows the clean-color flake as received (left) and after (right) recovery from the DCM treatment by filtration and no additional drying. Most of the dyes have been extracted from the treated material, the blue colorant remaining is mostly insoluble pigments which are easily removed by filtration during a subsequent recycling process such as depolymerization. FIG. 4 shows the seven DCM solution time sequence samples (left). TABLE 1 shows the CIE color measurements of clean-color flake samples before (left) and after (right) DCM purification. As shown therein, the DCM purification of the original PET produced a resultant PET with improved optical qualities with L* increasing from 45.12 to 49.23 and significantly reduced color with a* decreasing from −9.22 to −2.6 (less green) and b* decreasing from +13.5 to +2.91 (less yellow).

TABLE 1

PRE AND POST COLOR REMOVAL FROM PET CLEAN-COLOR FLAKE

| Sample | L* | a* | b* | SD |
|---|---|---|---|---|
| PET Flake pre-color removal | | | | |
| 3 | 49.60 | −15.48 | 12.53 | |
| 3 | 49.53 | −15.88 | 12.24 | |
| 3 | 49.72 | −15.73 | 12.79 | |
| Avg | 49.62 | −15.70 | 12.52 | 0.22 |
| 2 | 43.98 | −6.34 | 15.21 | |
| 2 | 43.93 | −5.33 | 15.64 | |
| 2 | 44.36 | −6.88 | 15.29 | |
| Avg | 44.09 | −6.18 | 15.38 | 0.19 |
| 1 | 41.44 | −6.12 | 12.51 | |
| 1 | 41.44 | −6.11 | 12.51 | |
| 1 | 41.83 | −6.15 | 12.62 | |
| 1 | 41.70 | −5.12 | 12.71 | |
| Avg | 41.66 | −5.79 | 12.61 | 0.08 |
| Total Avg | 45.12 | −9.22 | 13.50 | |
| PET Flake post color removal & dried | | | | |
| 3 | 47.53 | −2.28 | 2.72 | |
| 3 | 47.76 | −2.53 | 2.79 | |
| 3 | 47.41 | −2.54 | 2.74 | |
| Avg | 47.57 | −2.45 | 2.75 | 0.03 |
| 2 | 51.13 | −2.40 | 2.99 | |
| 2 | 51.29 | −2.32 | 3.07 | |
| 2 | 51.57 | −2.27 | 3.11 | |
| Avg | 51.33 | −2.33 | 3.06 | 0.05 |
| 1 | 48.69 | −3.08 | 2.93 | |
| 1 | 48.82 | −3.08 | 2.85 | |
| 1 | 48.84 | −2.91 | 3.01 | |
| Avg | 48.78 | −3.02 | 2.93 | 0.07 |
| Total Avg | 49.23 | −2.60 | 2.91 | |

Figure 5:
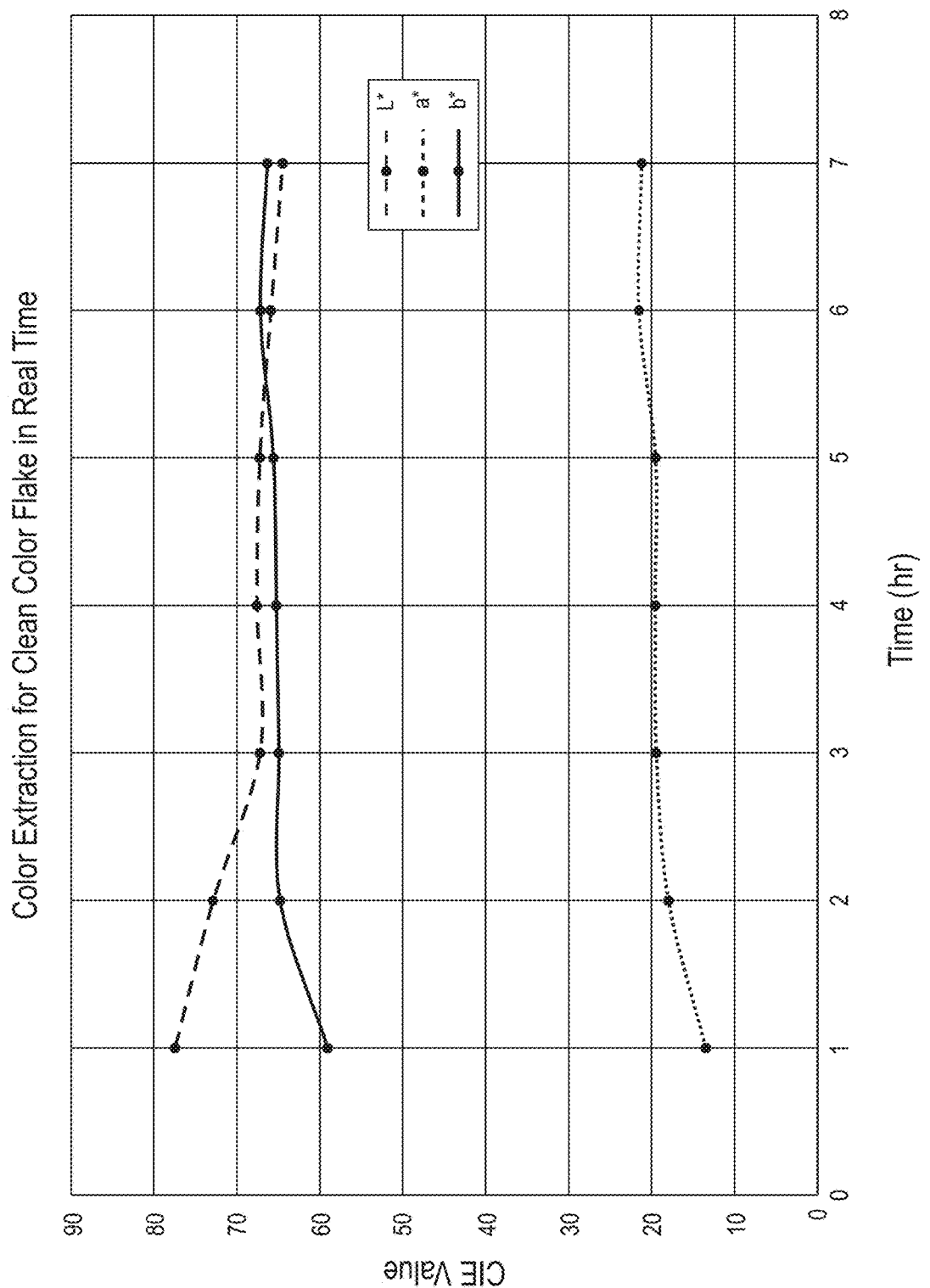
FIG. 5 is a graph that plots color extraction from DCM pre-treatment of CC PET flake in real time (Example 2).

L* = lightness from black (0) to white (100)
a* = green (−) to red (+)
b* = blue (−) to yellow (+)
SD = standard deviation TABLE 2 shows the CIE color measurements of the time sequence aliquots of the DCM liquid for the clean-color PET flake described herein and the curbside dirty mixed PET flake from Example 1 and FIG. 5 is a graph that plots the color extraction data from TABLE 2 for the clean-color PET flake. The date in TABLE 2 and FIG. 5 show that decolorization occurs within two hours at room temperature. The decolorization time would be expected to decrease by increasing the process temperature.

TABLE 2

COLOR EXTRACTION (SOLUTION) TIME SEQUENCE AT REAL TIME

| PET Flake Type @ Time | L* | a* | b* |
|---|---|---|---|
| Color @ 1 hr | 77.43 | 13.42 | 59.06 |
| Color @ 2 hr | 72.84 | 17.92 | 64.78 |
| Color @ 3 hr | 67.20 | 19.38 | 64.93 |
| Color @ 3 hr | 67.57 | 19.50 | 65.23 |
| Color @ 4 hr | 67.24 | 19.48 | 65.58 |
| Color @ 5 hr | 65.90 | 21.51 | 67.15 |
| Color @ 6 hr | 64.47 | 21.16 | 66.30 |
| Color @ 7 hr | 62.31 | 22.60 | 66.93 |
| Dirty Mixed @ 1 hr | 91.23 | 0.95 | 18.46 |
| Dirty Mixed @ 2 hr | 90.69 | 0.81 | 20.27 |
| Dirty Mixed @ 3 hr | 90.24 | 0.71 | 21.18 |

Example 3

DCM Purification of Black Polyester Fabric 50 g of cut pieces of black polyester fabric with a polyurethane decal was stirred with 250 g DCM in a 500 mL Erlenmeyer flask at room temperature. The liquid turned deep purple almost immediately. The sample was filtered after 1 hour and 15 minutes, rinsed with DCM, and sucked dry at which time the fabric weighed 49.5 g. The polyurethane decal was found to have lifted from the fabric and the fabric had turned a light blue color. The extractables from the reaction were a dark black/purple color after evaporation of the DCM, weighing 1.9 g (3.8%). FIG. 6 shows the black input polyester fabric (left), the decolorization in DCM (left center), the post-decolorization polyester fabric (right center), and the recovered dyes after evaporation of DCM (right).

Example 4

Purification/Decolorization of Clean-Color Pet Flake with HFIPA and Carbon Bed Filtration Clean-color PET flake was dissolved in HFIPA by rolling overnight. The solution was passed through a carbon bed to remove color and then spray dried against the walls of a flask rotating in a rotary evaporator to remove the solvent. The resultant PET film is shown in FIG. 7.

Example 5

Dissolution of Clean-Color and DCM Pre-Treated Clean-Color Pet Flake with Neat HFIPA Versus 30/70 HFIPA/DCM Clean-color PET flake and DCM pre-treated clean-color PET flake from Example 2 were each dissolved in DCM/HFIPA 70/30 and separately in neat HFIPA, all dissolutions carried out on a roller at room temperature. FIG. 8A shows the PET flake prior to solvent addition. The two vials on the right were pre-treated with DCM alone to purify and remove much of the color and not dried (the vials on the right bear the notation "Post H+DCM" and "Post HFIPA") and the two vials on the left are the untreated flake (the vials on the left bear the notation "Pre H+DCM" and "Pre HFIPA"). The first and third vials were treated with the 30/70 HFIPA/DCM and the second and fourth vials were treated with the neat HFIPA. The dissolution of the 30/70 HFIPA/DCM solution and the neat HFIPA solutions were each measured at 15, 30, and 45 minutes. FIG. 8B shows the PET samples 15 minutes after solvent addition. Significant amounts of undissolved PET are seen floating on the surface in the second and fourth vials where HFIPA was the only solvent. In contrast, the PET in the first vial was almost entirely dissolved and the PET in the third vial was completely dissolved showing that the non-solvent DCM surprisingly enhanced the dissolution rate of the PET in the DCM/HFIPA mixture. Further, the faster dissolution of the DCM-pre-treated PET in the third vial demonstrates that there is a benefit in the residual DCM present in this PET remaining from the DCM pre-treatment. FIG. 8C shows the PET samples 45 minutes after solvent addition. Even 30 minutes more time in the HFIPA solvent did not result in complete dissolution of the PET as shown in the second and fourth vials where undissolved PET flake is floating at the top of the solution. By contrast, the PET flakes in the first and third vials were completely dissolved prior to 45 minutes. All dissolution rates increased with increased temperature.

Example 6

Purification/Decolorization of Dirty Mixed (DM), Clean-Color (CC), and DCM Pre-Treated Clean-Color (PCC) Pet Flake with HFIPA Solutions of 10% w/v PET in HFIPA were prepared by dissolving 8 g each of curbside dirty mixed (DM), clean-color (CC), and DCM pre-treated clean-color (PCC) PET flake in 80 mL HFIPA with magnetic stirring at room temperature. The PCC flake sample was prepared by rolling 8 g of CC flake in 40 mL of DCM overnight followed by filtering. No extra drying was used to remove residual DCM from the sample before adding it to the HFIPA for dissolution. FIG. 9A shows the three PET flake samples dissolved in HFIPA. Undissolved impure polymer product (mainly polyolefins), dirt, and aluminum film were present in the DM flake preparation after the PET portion dissolved (FIG. 9A, left jar). The PCC flake sample, which was decolorized with DCM (FIG. 9A, right jar), was of much lighter color than the sample obtained from the untreated CC flake (FIG. 9A, middle jar). 1.6 g of activated charcoal was added to each of the PET-HFIPA solutions in FIG. 9A and stirred for two hours, then filtered through a bed of diatomaceous earth to obtain essentially colorless HFIPA solutions (FIG. 9B).

Example 7

Polymer Recovery from Purified/Decolored Dirty Mixed (DM), Clean-Color (CC), and Pre-Treated Clean-Color (PCC) Pet Flake Purified PET product was recovered from the solutions obtained in Example 6 by two different processes. For the first process, a majority of the solution from each sample was spray dried against the wall of a rotating flask under vacuum on a rotary evaporator and the obtained film peeled from the flask interior. The solvents were recovered in a dry ice/IPA trap for reuse. The second process precipitated the polymer from the portion of the somewhat viscous solution that clung to the walls of the Erlenmeyer after swirling, then rinsing with acetone squirted from a squeeze bottle. This process deposited a film of product PET against the walls of the flask, which was removed and dried in a vacuum oven at 65° C. FIG. 10 shows the input samples for the DM and CC PET flake, the spray-dried samples of the DM and CC PET flake as well as the CC flake pre-treated with the DMC (the PCC flake), and the precipitated DM, CC, and PCC PET flake.

Example 8

Purification/Decolorization of Clean-Color (CC), and DCM Pre-Treated Clean-Color (PCC) Pet Flake in 70/30 DCM/HFIPA 20 g of the CC PET and 20 g of the DCM PCC PET flake from Example 2 were each dissolved in 186.2 g DCM and 96.0 g HFIPA with magnetic stirring at room temperature. The PCC flake was used as recovered from the DCM wash solution with no additional evaporation prior to the addition of the DCM/HFIPA. Each of the two resultant solutions were divided into four portions and a portion of each was treated by stirring with activated carbon (JT Baker USP Grade JT1560-1, Avantor, Inc. Radnor, PA, USA) at 1, 2 and 5% loadings relative to PET with one portion used as reference. After 30 minutes, the solutions were pressure filtered through a short bed of diatomaceous earth (CELPURE® P300, Imerys Filtration Materials, Inc. Roswell, GA, USA) followed by filtration through a 1.0 urn PTFE (polytetrafluoroethylene) syringe filter membrane (ACRODISK® CR, Pall Corporation, Port Washington, NY, USA). FIG. 11 (top panel) shows the unfiltered solution for the CC PET flake and filtered solutions for the CC PET flake with 0%, 1%, 2%, and 5% activated carbon (AC). FIG. 11 (bottom panel) shows the unfiltered solution for the PCC PET flake and filtered solutions for the PCC PET flake with 0%, 2%, and 5% AC. FIG. 12 shows the CC PET flake and PCC PET flake 0%, 1%, 2% and 5% AC filtered solutions after secondary filtration through the 1.0 um PTFE filter membrane. The solution colors of the samples were measured with a Hunter Vista colorimeter (Hunter Associates Laboratory, Inc. Reston, VA, USA). TABLE 3 shows the CIE color measurements of the solutions. The data in TABLE 3 and appearance of the solutions in FIG. 12 show that a significant color reduction occurred when the PET flake was pre-treated with DCM prior to dissolution into the DCM/HFIPA mixture and that a further reduction in color occurred with treatment of minimal amounts of activated carbon (1%). The decrease in color is shown by the L* increase from 90 to 98 (increase in whiteness) and the decrease in a* from −4.73 to −0.31 (less red) and b* from 37.1 to 4.01 (less yellow). The two-color removal steps were found to be complimentary, with each contributing to the total improvement in optical quality of the product.

TABLE 3

DECOLORIZATION OD CC FLAKF AND PCC FLAKF SOLUTIONS IN DCM/HFIP

| Clean-color PET Flake | Activated Carbon loading (% to PET) | L* | a* | b* |
|---|---|---|---|---|
| With No Treatment (CC Flake) | 0.00 | 76.67 | 6.97 | 54.50 |
| | 0.93 | 86.78 | −4.92 | 43.54 |
| | 1.85 | 87.13 | −4.54 | 41.62 |
| | 4.68 | 90.07 | −4.73 | 37.09 |
| With DCM Pre-treatment (PCC Flake) | 0.00 | 91.95 | 4.25 | 9.45 |
| | 1.00 | 97.26 | −0.41 | 4.18 |
| | 2.00 | 97.56 | −0.33 | 3.49 |
| | 5.00 | 98.00 | −0.31 | 4.01 |

L* = lightness from black (0) to white (100)
a* = green (−) to red (+)
b* = blue (−) to yellow (+)
SD = standard deviation Example 9

Polymer Recovery from Purified/Decolored Clean-Color (CC), and Pre-Treated Clean-Color (PCC) Pet Flake Purified PET product was recovered from the solutions obtained in Example 8 by spray drying the solutions against the wall of a rotating flask at 40° C. under vacuum on a rotary evaporator and the obtained film scraped from the flask interior. The DCM and HFIPA were recovered in a dry ice/IPA trap for reuse. The films were dried in a vacuum oven at 65° C. FIG. 13 shows photos of the four PET films obtained along with the CIE color measurements of each. The top panel shows two films obtained from the CC PET flake (no pre-treated with DCM) and the bottom panel shows two films obtained the PCC flake (pre-treated with DCM). The films on the left show PET recovered from solution without activated carbon decolorization and the right sample shows PET recovered from solution after decolorization with 5% activated carbon. The films shown in the top panels have a darker, brownish coloration that is absent from the films in the bottom panels; the latter films demonstrating improved optical quality over the former films.

We claim:

1. A method comprising:
    treating a waste material comprising a polyester with a dissolution solution comprising hexafluoroisopropyl alcohol and a chlorinated hydrocarbon and/or an aromatic hydrocarbon to form dissolved polyester;
    purifying the dissolved polyester; and
    treating the purified and dissolved polyester with a technique to produce solid polyester, wherein the dissolution solution is separated from the solid polyester.

2. The method of claim 1, wherein the chlorinated hydrocarbon is dichloromethane.

3. The method of claim 1, wherein the aromatic hydrocarbon is toluene and/or xylene.

4. The method of claim 1, wherein the dissolution solution comprises 30% hexafluoroisopropyl alcohol and 70% dichloromethane.

5. The method of claim 1, wherein the dissolution solution comprises 1-85% dichloromethane.

6. The method of claim 1, wherein the separated dissolution solution is recovered for reuse by distillation and/or condensation.

7. The method of claim 1, wherein the dissolved polyester is purified by decolorization and/or deionization.

8. The method of claim 1, wherein the dissolved polyester is purified with a treatment selected from the group consisting of activated carbon, ion exchange, filtration, and combinations thereof.

9. The method of claim 1, wherein the technique to produce the solid polyester is selected from the group consisting of evaporation, spray drying, precipitation, and combinations thereof.

10. The method of claim 1, wherein the solid polyester is recycled by a chemical or mechanical recycling process.

11. The method of claim 10, wherein the chemical recycling process is selected from the group consisting of alcoholysis, hydrolysis, acidolysis, phosphorolysis, aminolysis, ammonolysis, and enzymolysis.

12. The method of claim 10, wherein the chemical recycling process is glycolysis depolymerization.

13. The method of claim 1, wherein prior to treatment with the dissolution solution, the waste polyester is separately pre-treated with a polyester non-solvent to remove impurities from the waste polyester.

14. The method of claim 13, wherein the polyester non-solvent is selected from the group consisting of chlorinated hydrocarbons, aromatic hydrocarbons, and combinations thereof.

15. The method of claim 13, wherein the polyester non-solvent is selected from the group consisting of dichloromethane, toluene, xylene, and combinations thereof.

16. A method comprising:
    treating a waste material comprising polyethylene terephthalate (PET) with a dissolution solution comprising 30% hexafluoroisopropyl alcohol and 70% dichloromethane to form dissolved PET;
    purifying the dissolved PET; and
    treating the purified and dissolved PET with a technique to produce solid PET for reuse, wherein the dissolution solution is separated from the solid PET.

17. The method of claim 16, wherein the separated dissolution solution is recovered for reuse by distillation and/or condensation.

18. The method of claim 16, wherein the dissolved PET is purified by decolorization and/or deionization.

19. The method of claim 16, wherein the dissolved PET is purified with a treatment selected from the group consisting of activated carbon, ion exchange, filtration, and combinations thereof.

20. The method of claim 16, wherein the technique to produce the solid PET is selected from the group consisting of evaporation, spray drying, precipitation, and combinations thereof.

21. The method of claim 16, wherein the solid PET is recycled by a chemical or mechanical recycling process.

22. The method of claim 21, wherein the chemical recycling process is selected from the group consisting of alcoholysis, hydrolysis, acidolysis, phosphorolysis, aminolysis, ammonolysis, and enzymolysis.

23. The method of claim 21, wherein the chemical recycling process is glycolysis depolymerization.

24. The method of claim 16, wherein prior to treatment with the dissolution solution, the waste material is separately pre-treated with dichloromethane to remove impurities from the waste sample.

25. The method of claim 16, wherein the waste material is colored, dirty, and/or mixed PET flake.

26. The method of claim 16, wherein the waste material comprises a colored PET fabric and/or fiber.

* * * * *